US008885796B2

(12) United States Patent
Geldenbott et al.

(10) Patent No.: US 8,885,796 B2
(45) Date of Patent: *Nov. 11, 2014

(54) EXTENDED EFFICIENT USAGE OF EMERGENCY SERVICES KEYS

(75) Inventors: Gerhard Geldenbott, Seattle, WA (US); Yinjun Zhu, Sammamish, WA (US); John Gordon Hines, Kirkland, WA (US); Victor Burton, Bellevue, WA (US)

(73) Assignee: TeleCommunications Systems, Inc., Annapolis, MD (US)

( * ) Notice: Subject to any disclaimer, the term of this patent is extended or adjusted under 35 U.S.C. 154(b) by 58 days.

This patent is subject to a terminal disclaimer.

(21) Appl. No.: 13/532,432

(22) Filed: Jun. 25, 2012

(65) Prior Publication Data

US 2012/0263279 A1    Oct. 18, 2012

Related U.S. Application Data

(63) Continuation of application No. 11/987,048, filed on Nov. 27, 2007, now Pat. No. 8,208,605, which is a continuation-in-part of application No. 11/797,445, filed on May 3, 2007, now Pat. No. 8,532,266.

(60) Provisional application No. 60/797,359, filed on May 4, 2006.

(51) Int. Cl.
*H04M 11/04* (2006.01)
*H04L 29/06* (2006.01)

(52) U.S. Cl.
CPC ...... *H04L 29/06027* (2013.01); *H04L 65/1069* (2013.01); *H04L 65/4007* (2013.01); *H04M 2242/04* (2013.01); *H04M 11/04* (2013.01); *H04Q 2213/1337* (2013.01)

USPC .......................................... 379/45

(58) Field of Classification Search
USPC .......................................... 379/45
See application file for complete search history.

(56) References Cited

U.S. PATENT DOCUMENTS

| 1,103,073 A | 7/1914 | O'Connell |
| 4,445,118 A | 4/1984 | Taylor et al. |

(Continued)

FOREIGN PATENT DOCUMENTS

| WO | WO99/21380 | 10/1998 |
| WO | WO01/45342 | 6/2001 |

(Continued)

OTHER PUBLICATIONS

International Search Report received in PCT/US2012/000422 dated Dec. 10, 2012.

(Continued)

*Primary Examiner* — Alexander Jamal
(74) *Attorney, Agent, or Firm* — William H. Bollman

(57) ABSTRACT

An emergency services key (e.g., ESQK or ESRK) is guaranteed to be available from a limited size ESQK pool. A plurality of ESQKs are grouped into a pool of emergency service keys "ESQK Pool ID", each including anywhere from 1 to N number of ESQKs. Each ESQK preferably has a "Timestamp", information relating to the specific emergency E911 call ("Call Data ID"), a guard timer, and an optional hold timer. The ESQK having a Call Data ID="NULL", and having the oldest Timestamp, is chosen for selection. If no such ESQK has both Call Data ID=NULL and the oldest Timestamp is found, then the ESQK with merely the oldest Timestamp is selected. The timestamp is reset to a current time plus a guard timer, or hold timer if desired.

18 Claims, 5 Drawing Sheets

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,737,916 A | 4/1988 | Ogawa |
| 4,891,638 A | 1/1990 | Davis |
| 4,891,650 A | 1/1990 | Scheffer |
| 4,939,662 A | 7/1990 | Numura |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Scheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,389,934 A | 2/1995 | Kass |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | Dennison |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,557,254 A | 9/1996 | Johnson |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,122 A | 6/1997 | Shah |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,684,951 A | 11/1997 | Goldman |
| 5,689,245 A | 11/1997 | Noreen |
| 5,689,269 A | 11/1997 | Norris |
| 5,689,809 A | 11/1997 | Grube |
| 5,699,053 A | 12/1997 | Jonsson |
| 5,727,057 A | 3/1998 | Emery |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,774,824 A | 6/1998 | Streit |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,801,700 A | 9/1998 | Ferguson |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,926,118 A | 7/1999 | Hayashida |
| 5,930,250 A | 7/1999 | Klok |
| 5,944,768 A | 8/1999 | Ito |
| 5,953,398 A | 9/1999 | Hill |
| 5,960,362 A | 9/1999 | Grob |
| 5,974,054 A | 10/1999 | Couts |

(56) References Cited

U.S. PATENT DOCUMENTS

| | | | |
|---|---|---|---|
| 5,978,685 A | 11/1999 | Laiho | |
| 5,982,301 A | 11/1999 | Ohta | |
| 5,983,099 A | 11/1999 | Yao | |
| 5,983,109 A | 11/1999 | Montoya | |
| 5,987,323 A | 11/1999 | Houtari | |
| 5,998,111 A | 12/1999 | Abe | |
| 5,999,124 A | 12/1999 | Sheynblat | |
| 6,002,936 A | 12/1999 | Roel-Ng | |
| 6,014,602 A | 1/2000 | Kithol | |
| 6,014,722 A * | 1/2000 | Rudin et al. | 710/240 |
| 6,032,051 A | 2/2000 | Hall | |
| 6,035,025 A | 3/2000 | Hanson | |
| 6,035,253 A | 3/2000 | Hayahi | |
| 6,049,710 A | 4/2000 | Nilsson | |
| 6,052,081 A | 4/2000 | Krasner | |
| 6,058,300 A | 5/2000 | Hanson | |
| 6,061,018 A | 5/2000 | Sheynblat | |
| 6,061,346 A | 5/2000 | Nordman | |
| 6,064,336 A | 5/2000 | Krasner | |
| 6,064,875 A | 5/2000 | Morgan | |
| 6,067,045 A | 5/2000 | Castelloe | |
| 6,070,067 A | 5/2000 | Nguyen | |
| 6,075,982 A | 6/2000 | Donovan | |
| 6,081,229 A | 6/2000 | Soliman | |
| 6,081,508 A | 6/2000 | West | |
| 6,085,320 A | 7/2000 | Kaliski, Jr. | |
| 6,091,957 A | 7/2000 | Larkins | |
| 6,101,378 A | 8/2000 | Barabash | |
| 6,108,533 A | 8/2000 | Brohoff | |
| 6,115,611 A | 9/2000 | Kimoto | |
| 6,122,503 A | 9/2000 | Daly | |
| 6,122,520 A | 9/2000 | Want | |
| 6,124,810 A | 9/2000 | Segal | |
| 6,128,664 A | 10/2000 | Yanagidate | |
| 6,131,067 A | 10/2000 | Girerd | |
| 6,133,874 A | 10/2000 | Krasner | |
| 6,134,316 A | 10/2000 | Kallioniemi | |
| 6,134,483 A | 10/2000 | Vayanos | |
| 6,138,003 A | 10/2000 | Kingdon | |
| 6,148,197 A | 11/2000 | Bridges | |
| 6,148,198 A | 11/2000 | Anderson | |
| 6,149,353 A | 11/2000 | Nilsson | |
| 6,150,980 A | 11/2000 | Krasner | |
| 6,154,172 A | 11/2000 | Piccionelli | |
| 6,169,516 B1 | 1/2001 | Watanabe | |
| 6,169,891 B1 | 1/2001 | Gorham | |
| 6,169,901 B1 | 1/2001 | Boucher | |
| 6,169,902 B1 | 1/2001 | Kawamoto | |
| 6,173,181 B1 | 1/2001 | Losh | |
| 6,178,505 B1 | 1/2001 | Schneider | |
| 6,178,506 B1 | 1/2001 | Quick, Jr. | |
| 6,181,935 B1 | 1/2001 | Gossman | |
| 6,181,939 B1 | 1/2001 | Ahvenainen | |
| 6,182,006 B1 | 1/2001 | Meek | |
| 6,182,227 B1 | 1/2001 | Blair | |
| 6,185,426 B1 | 2/2001 | Alperovich | |
| 6,188,354 B1 | 2/2001 | Soliman | |
| 6,188,752 B1 | 2/2001 | Lesley | |
| 6,188,909 B1 | 2/2001 | Alananra | |
| 6,188,957 B1 | 2/2001 | Bechtolsheim | |
| 6,189,098 B1 | 2/2001 | Kaliski, Jr. | |
| 6,195,557 B1 | 2/2001 | Havinis | |
| 6,198,431 B1 | 3/2001 | Gibson | |
| 6,199,045 B1 | 3/2001 | Giniger | |
| 6,199,113 B1 | 3/2001 | Alegre | |
| 6,204,844 B1 | 3/2001 | Fumarolo | |
| 6,205,330 B1 | 3/2001 | Windbladh | |
| 6,208,290 B1 | 3/2001 | Krasner | |
| 6,208,854 B1 | 3/2001 | Roberts | |
| 6,215,441 B1 | 4/2001 | Moeglein | |
| 6,219,557 B1 | 4/2001 | Havinis | |
| 6,223,046 B1 | 4/2001 | Hamill-Keays | |
| 6,226,529 B1 | 5/2001 | Bruno | |
| 6,239,742 B1 | 5/2001 | Krasner | |
| 6,247,135 B1 | 6/2001 | Feaugue | |
| 6,249,680 B1 | 6/2001 | Wax | |
| 6,249,742 B1 | 6/2001 | Frriederich | |
| 6,249,744 B1 | 6/2001 | Morita | |
| 6,249,873 B1 | 6/2001 | Richard | |
| 6,253,074 B1 | 6/2001 | Carlsson | |
| 6,253,203 B1 | 6/2001 | O'Flaherty | |
| 6,260,147 B1 | 7/2001 | Quick, Jr. | |
| 6,266,614 B1 | 7/2001 | Alumbaugh | |
| 6,275,692 B1 | 8/2001 | Skog | |
| 6,275,849 B1 | 8/2001 | Ludwig | |
| 6,278,701 B1 | 8/2001 | Ayyagari | |
| 6,278,936 B1 | 8/2001 | Jones | |
| 6,289,373 B1 | 9/2001 | Dezonno | |
| 6,297,768 B1 | 10/2001 | Allen, Jr. | |
| 6,307,504 B1 | 10/2001 | Sheynblat | |
| 6,308,269 B2 | 10/2001 | Proidl | |
| 6,313,786 B1 | 11/2001 | Sheynblat | |
| 6,317,594 B1 | 11/2001 | Gossman | |
| 6,317,684 B1 | 11/2001 | Roeseler | |
| 6,321,091 B1 | 11/2001 | Holland | |
| 6,321,092 B1 | 11/2001 | Fitch | |
| 6,321,158 B1 | 11/2001 | DeLorme | |
| 6,321,257 B1 | 11/2001 | Kotala | |
| 6,324,542 B1 | 11/2001 | Lent | |
| 6,327,473 B1 | 12/2001 | Soliman | |
| 6,327,479 B1 | 12/2001 | Mikkola | |
| 6,331,825 B1 | 12/2001 | Ladner | |
| 6,333,919 B2 | 12/2001 | Gaffney | |
| 6,360,093 B1 | 3/2002 | Ross | |
| 6,360,102 B1 | 3/2002 | Havinis | |
| 6,363,254 B1 | 3/2002 | Jones | |
| 6,366,782 B1 | 4/2002 | Fumarolo | |
| 6,366,856 B1 | 4/2002 | Johnson | |
| 6,367,019 B1 | 4/2002 | Ansell | |
| 6,370,389 B1 | 4/2002 | Isomursu | |
| 6,377,209 B1 | 4/2002 | Krasner | |
| 6,397,143 B1 | 5/2002 | Paschke | |
| 6,400,314 B1 | 6/2002 | Krasner | |
| 6,400,943 B1 | 6/2002 | Montoya | |
| 6,400,958 B1 | 6/2002 | Isomursu | |
| 6,411,254 B1 | 6/2002 | Moeglein | |
| 6,415,224 B1 | 7/2002 | Wako | |
| 6,421,002 B2 | 7/2002 | Krasner | |
| 6,427,001 B1 | 7/2002 | Contractor | |
| 6,429,808 B1 | 8/2002 | King | |
| 6,433,734 B1 | 8/2002 | Krasner | |
| 6,434,381 B1 | 8/2002 | Moore | |
| 6,441,752 B1 | 8/2002 | Fomukong | |
| 6,442,384 B1 | 8/2002 | Shah | |
| 6,442,391 B1 | 8/2002 | Johansson | |
| 6,449,473 B1 | 9/2002 | Raivisto | |
| 6,449,476 B1 | 9/2002 | Hutchinson, IV | |
| 6,456,852 B2 | 9/2002 | Bar | |
| 6,463,272 B1 | 10/2002 | Wallace | |
| 6,466,788 B1 | 10/2002 | Carlsson | |
| 6,477,150 B1 | 11/2002 | Maggenti | |
| 6,504,491 B1 | 1/2003 | Christians | |
| 6,505,049 B1 | 1/2003 | Dorenbosch | |
| 6,510,387 B2 | 1/2003 | Fuchs | |
| 6,512,922 B1 | 1/2003 | Burg | |
| 6,512,930 B2 | 1/2003 | Sandegren | |
| 6,515,623 B2 | 2/2003 | Johnson | |
| 6,519,466 B2 | 2/2003 | Pande | |
| 6,522,682 B1 | 2/2003 | Kohli | |
| 6,526,026 B1 | 2/2003 | Menon | |
| 6,529,500 B1 | 3/2003 | Pandharipande | |
| 6,529,722 B1 | 3/2003 | Heinrich | |
| 6,529,829 B2 | 3/2003 | Turetzky | |
| 6,531,982 B1 | 3/2003 | White | |
| 6,538,757 B1 | 3/2003 | Sansone | |
| 6,539,200 B1 | 3/2003 | Schiff | |
| 6,539,232 B2 | 3/2003 | Hendrey et al. | |
| 6,539,304 B1 | 3/2003 | Chansarkar | |
| 6,542,464 B1 | 4/2003 | Takeda | |
| 6,542,734 B1 | 4/2003 | Abrol | |
| 6,542,743 B1 | 4/2003 | Soliman | |
| 6,549,522 B1 | 4/2003 | Flynn | |
| 6,549,776 B1 | 4/2003 | Joong | |
| 6,549,844 B1 | 4/2003 | Egberts | |

(56) References Cited

U.S. PATENT DOCUMENTS

| | | |
|---|---|---|
| 6,556,832 B1 | 4/2003 | Soliman |
| 6,560,461 B1 | 5/2003 | Fomukong |
| 6,560,534 B2 | 5/2003 | Abraham |
| 6,563,824 B1 | 5/2003 | Bhatia |
| 6,564,261 B1 | 5/2003 | Gudjonsson |
| 6,570,530 B2 | 5/2003 | Gaal |
| 6,571,095 B1 | 5/2003 | Koodli |
| 6,571,174 B2 | 5/2003 | Rigazio |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,423 B1 | 9/2003 | Cooper |
| 6,621,452 B2 | 9/2003 | Knockeart |
| 6,621,810 B1 | 9/2003 | Leung |
| 6,628,233 B2 | 9/2003 | Knockeart |
| 23003/020193 | 10/2003 | Durst |
| 6,633,255 B2 | 10/2003 | Krasner |
| 6,640,184 B1 | 10/2003 | Rabe |
| 6,640,185 B2 | 10/2003 | Tokota |
| 6,643,516 B1 | 11/2003 | Stewart |
| 6,650,288 B1 | 11/2003 | Pitt |
| 6,661,353 B1 | 12/2003 | Gopen |
| 6,661,372 B1 | 12/2003 | Girerd |
| 6,665,540 B2 | 12/2003 | Sih |
| 6,665,541 B1 | 12/2003 | Krasner |
| 6,665,613 B2 | 12/2003 | Duvall |
| 6,665,715 B1 | 12/2003 | Houri |
| 6,671,620 B1 | 12/2003 | Garin |
| 6,677,894 B2 | 1/2004 | Sheynblat |
| 6,680,694 B1 | 1/2004 | Knockheart |
| 6,687,504 B1 | 2/2004 | Raith |
| 6,691,019 B2 | 2/2004 | Seeley |
| 6,694,258 B2 | 2/2004 | Johnson |
| 6,694,351 B1 | 2/2004 | Shaffer |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,652 B1 | 4/2004 | Sanqunetti |
| 6,721,716 B1 | 4/2004 | Gross |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,266 B1 | 6/2004 | Hundscheidt |
| 6,757,544 B2 | 6/2004 | Rangarajan |
| 6,757,545 B2 | 6/2004 | Nowak |
| 6,766,174 B1 | 7/2004 | Kenyon |
| 6,771,639 B1 | 8/2004 | Holden |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,801,850 B1 | 10/2004 | Wolfson |
| 6,804,524 B1 | 10/2004 | Vandermaijden |
| 6,807,534 B1 | 10/2004 | Erickson |
| 6,810,323 B1 | 10/2004 | Bullock |
| 6,810,405 B1 | 10/2004 | LaRue |
| 6,813,264 B2 | 11/2004 | Vassilovski |
| 6,813,501 B2 | 11/2004 | Kinnunen |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,816,782 B1 | 11/2004 | Walters |
| 6,819,919 B1 | 11/2004 | Tanaka |
| 6,820,269 B2 | 11/2004 | Kogan |
| 6,829,475 B1 | 12/2004 | Lee |
| 6,829,532 B2 | 12/2004 | Obradovich |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,839,630 B2 | 1/2005 | Sakamoto |
| 6,842,696 B2 | 1/2005 | Silvester |
| 6,842,715 B1 | 1/2005 | Gaal |
| 6,845,321 B1 | 1/2005 | Kerns |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,895,329 B1 | 5/2005 | Wolfson |
| 6,898,516 B2 | 5/2005 | Pechatnikov |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,910,818 B2 | 6/2005 | McLoone |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,925,603 B1 | 8/2005 | Naito |
| 6,930,634 B2 | 8/2005 | Peng |
| 6,934,705 B2 | 8/2005 | Tu |
| 6,937,187 B2 | 8/2005 | Van Diggelen |
| 6,937,872 B2 | 8/2005 | Krasner |
| 6,940,950 B2 | 9/2005 | Dickinson et al. |
| 6,941,144 B2 | 9/2005 | Stein |

(56) References Cited

U.S. PATENT DOCUMENTS

| | | |
|---|---|---|
| 6,944,535 B2 | 9/2005 | Iwata |
| 6,944,540 B2 | 9/2005 | King |
| 6,947,772 B2 | 9/2005 | Minear |
| 6,950,058 B1 | 9/2005 | Davis |
| 6,957,068 B2 | 10/2005 | Hutchinson |
| 6,957,073 B2 | 10/2005 | Bye |
| 6,961,562 B2 | 11/2005 | Ross |
| 6,963,557 B2 | 11/2005 | Knox |
| 6,963,748 B2 | 11/2005 | Chithambaram |
| 6,965,754 B2 | 11/2005 | King |
| 6,965,767 B2 | 11/2005 | Maggenti |
| 6,968,044 B2 | 11/2005 | Beason |
| 6,970,871 B1 | 11/2005 | Rayburn |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,990,081 B2 | 1/2006 | Schaefer |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,058,506 B2 | 6/2006 | Kawase |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,089,110 B2 | 8/2006 | Pechatnikov |
| 7,092,385 B2 | 8/2006 | Gallant |
| 7,103,018 B1 | 9/2006 | Hansen |
| 7,103,574 B1 | 9/2006 | Peinado |
| 7,106,717 B2 | 9/2006 | Rosseau |
| 7,110,773 B1 | 9/2006 | Wallace |
| 7,123,693 B2 * | 10/2006 | Nelson et al. ............ 379/45 |
| 7,136,466 B1 | 11/2006 | Gao |
| 7,136,838 B1 | 11/2006 | Peinado |
| 7,142,163 B2 | 11/2006 | Connor |
| 7,142,196 B1 | 11/2006 | Connor |
| 7,142,205 B2 | 11/2006 | Chithambaram |
| 7,145,900 B2 | 12/2006 | Nix |
| 7,151,946 B2 | 12/2006 | Maggenti |
| 7,167,187 B2 | 1/2007 | Scott |
| 7,171,220 B2 | 1/2007 | Belcea |
| 7,171,304 B2 | 1/2007 | Wako |
| 7,177,397 B2 | 2/2007 | McCalmont |
| 7,177,398 B2 | 2/2007 | Meer |
| 7,177,399 B2 * | 2/2007 | Dawson et al. ............ 379/45 |
| 7,177,400 B2 * | 2/2007 | Eisner et al. ............ 379/45 |
| 7,184,418 B1 | 2/2007 | Baba |
| 7,200,380 B2 | 4/2007 | Havlark |
| 7,202,801 B2 | 4/2007 | Chou |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,245,910 B2 | 7/2007 | Osmo |
| 7,251,312 B2 * | 7/2007 | D'Evelyn et al. ........ 379/45 |
| 7,260,186 B2 | 8/2007 | Zhu |
| 7,260,384 B2 | 8/2007 | Bales |
| 7,266,376 B2 | 9/2007 | Nakagawa |
| 7,286,929 B2 | 10/2007 | Staton |
| 7,330,899 B2 | 2/2008 | Wong |
| 7,333,480 B1 | 2/2008 | Clarke |
| 7,340,241 B2 | 3/2008 | Rhodes |
| 7,369,508 B2 | 5/2008 | Parantainen |
| 7,369,530 B2 | 5/2008 | Keagy |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky |
| 7,450,951 B2 | 11/2008 | Vimpari |
| 7,453,990 B2 | 11/2008 | Welenson |
| 7,477,903 B2 | 1/2009 | Wilcock |
| 7,495,608 B1 | 2/2009 | Chen |
| 7,522,581 B2 | 4/2009 | Acharya |
| 7,565,157 B1 | 7/2009 | Ortega |
| 7,602,886 B1 | 10/2009 | Beech |
| 7,623,447 B1 | 11/2009 | Faccin |
| 7,627,331 B2 | 12/2009 | Winterbottom |
| 7,653,544 B2 | 1/2010 | Bradley |
| 7,660,321 B2 | 2/2010 | Cortes |
| 7,702,081 B1 | 4/2010 | Klesper |
| 7,711,094 B1 | 5/2010 | Olshansky |
| 7,739,033 B2 | 6/2010 | Murata |
| 7,747,258 B2 | 6/2010 | Farmer |
| 7,751,614 B2 | 7/2010 | Funakura |
| 7,774,003 B1 | 8/2010 | Ortega |
| 7,783,297 B2 | 8/2010 | Ishii |
| 7,822,823 B2 | 10/2010 | Jhanji |
| 7,881,233 B2 | 2/2011 | Bieselin |
| 7,881,730 B2 | 2/2011 | Sheha |
| 7,895,263 B1 | 2/2011 | Kirchmeier |
| 7,937,067 B2 | 5/2011 | Maier |
| 8,005,683 B2 | 8/2011 | Tessesl |
| 8,027,658 B2 | 9/2011 | Suryanarayana |
| 8,060,389 B2 | 11/2011 | Johnson |
| 2001/0011247 A1 | 8/2001 | O'Flaherty |
| 2001/0015756 A1 | 8/2001 | Wilcock |
| 2001/0016849 A1 | 8/2001 | Squibbs |
| 2002/0032036 A1 | 3/2002 | Nakajima |
| 2002/0037735 A1 | 3/2002 | Maggenti |
| 2002/0052214 A1 | 5/2002 | Maggenti |
| 2002/0058515 A1 | 5/2002 | Holler |
| 2002/0061760 A1 | 5/2002 | Maggenti |
| 2002/0069239 A1 | 6/2002 | Katada |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086683 A1 | 7/2002 | Kohar |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0123354 A1 | 9/2002 | Nowak |
| 2002/0126656 A1 | 9/2002 | Park |
| 2002/0130906 A1 | 9/2002 | Miyaki |
| 2002/0158777 A1 | 10/2002 | Flick |
| 2002/0164998 A1 | 11/2002 | Younis |
| 2002/0169539 A1 | 11/2002 | Menard |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0014487 A1 | 1/2003 | Iwakawa |
| 2003/0016804 A1 | 1/2003 | Sheha |
| 2003/0026245 A1 | 2/2003 | Ejzak |
| 2003/0032448 A1 | 2/2003 | Bulthuis |
| 2003/0036848 A1 | 2/2003 | Sheha |
| 2003/0036949 A1 | 2/2003 | Kaddeche |
| 2003/0037163 A1 | 2/2003 | Kitada |
| 2003/0040272 A1 | 2/2003 | Lelievre |
| 2003/0044654 A1 | 3/2003 | Holt |
| 2003/0045327 A1 | 3/2003 | Kobayashi |
| 2003/0054835 A1 | 3/2003 | Gutowski |
| 2003/0060938 A1 | 3/2003 | Duvall |
| 2003/0065788 A1 | 4/2003 | Salomaki |
| 2003/0072318 A1 | 4/2003 | Lam |
| 2003/0078054 A1 | 4/2003 | Okuda |
| 2003/0078064 A1 | 4/2003 | Chan |
| 2003/0081557 A1 | 5/2003 | Mettala |
| 2003/0096623 A1 | 5/2003 | Kim |

(56) References Cited

U.S. PATENT DOCUMENTS

| | | |
|---|---|---|
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont et al. |
| 2003/0114157 A1 | 6/2003 | Spitz |
| 2003/0118160 A1 | 6/2003 | Holt |
| 2003/0119521 A1 | 6/2003 | Tipnis |
| 2003/0119528 A1 | 6/2003 | Pew |
| 2003/0125064 A1 | 7/2003 | Koskinen |
| 2003/0126250 A1 | 7/2003 | Jhanji |
| 2003/0137961 A1 | 7/2003 | Tsirtsis |
| 2003/0149526 A1 | 8/2003 | Zhou |
| 2003/0151501 A1 | 8/2003 | Teckchandani |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0165254 A1 | 9/2003 | Chen |
| 2003/0182053 A1 | 9/2003 | Swope |
| 2003/0186709 A1 | 10/2003 | Rhodes |
| 2003/0196105 A1 | 10/2003 | Fineburg |
| 2003/0204640 A1 | 10/2003 | Sahineja |
| 2003/0223381 A1 | 12/2003 | Schroderus |
| 2003/0231190 A1 | 12/2003 | Jawerth |
| 2003/0236618 A1 | 12/2003 | Kamikawa |
| 2004/0002326 A1 | 1/2004 | Maher |
| 2004/0002814 A1 | 1/2004 | Gogic |
| 2004/0004761 A1 | 1/2004 | Travis |
| 2004/0008225 A1 | 1/2004 | Cambell |
| 2004/0021567 A1 | 2/2004 | Dunn |
| 2004/0032485 A1 | 2/2004 | Stephens |
| 2004/0041729 A1 | 3/2004 | Rowitch |
| 2004/0043775 A1 | 3/2004 | Kennedy |
| 2004/0044623 A1 | 3/2004 | Wake |
| 2004/0047342 A1 | 3/2004 | Gavish |
| 2004/0047461 A1 | 3/2004 | Weisman et al. |
| 2004/0054428 A1 | 3/2004 | Sheha |
| 2004/0068724 A1 | 4/2004 | Gardner |
| 2004/0076277 A1 | 4/2004 | Kuusinen |
| 2004/0098497 A1 | 5/2004 | Banet |
| 2004/0124977 A1 | 7/2004 | Biffar |
| 2004/0132465 A1 | 7/2004 | Mattila |
| 2004/0146040 A1 | 7/2004 | Phan-Anh |
| 2004/0181689 A1 | 9/2004 | Kiyoto |
| 2004/0184584 A1 | 9/2004 | McCalmont |
| 2004/0186880 A1 | 9/2004 | Yamamoto |
| 2004/0190497 A1 | 9/2004 | Knox |
| 2004/0198332 A1 | 10/2004 | Lundsgaard |
| 2004/0198375 A1 | 10/2004 | Schwengler |
| 2004/0198386 A1 | 10/2004 | Dupray |
| 2004/0203732 A1 | 10/2004 | Brusilovsky |
| 2004/0204829 A1 | 10/2004 | Endo |
| 2004/0204847 A1 | 10/2004 | Yanai |
| 2004/0205151 A1 | 10/2004 | Sprigg |
| 2004/0205517 A1 | 10/2004 | Lampert |
| 2004/0220957 A1 | 11/2004 | McDonough |
| 2004/0229632 A1 | 11/2004 | Flynn |
| 2004/0242238 A1 | 12/2004 | Wang |
| 2004/0267445 A1 | 12/2004 | De Luca |
| 2005/0021769 A1 | 1/2005 | Kim |
| 2005/0027445 A1 | 2/2005 | McDonough |
| 2005/0028034 A1 | 2/2005 | Gantman |
| 2005/0031095 A1 | 2/2005 | Pietrowics |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0053209 A1 | 3/2005 | D'Evelyn |
| 2005/0062636 A1 | 3/2005 | Conway |
| 2005/0063519 A1 | 3/2005 | James |
| 2005/0071671 A1 | 3/2005 | Karaoguz |
| 2005/0074107 A1 | 4/2005 | Renner |
| 2005/0078612 A1 | 4/2005 | Lang |
| 2005/0083911 A1 | 4/2005 | Grabelsky |
| 2005/0085999 A1 | 4/2005 | Onishi |
| 2005/0086467 A1 | 4/2005 | Asokan |
| 2005/0090236 A1 | 4/2005 | Schwinke |
| 2005/0101335 A1 | 5/2005 | Kelly |
| 2005/0107637 A1 | 5/2005 | Ball |
| 2005/0107673 A1 | 5/2005 | Ball |
| 2005/0111630 A1 | 5/2005 | Potorny |
| 2005/0112030 A1 | 5/2005 | Gaus |
| 2005/0119012 A1 | 6/2005 | Merheb |
| 2005/0125148 A1 | 6/2005 | Van Buer |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0159883 A1 | 7/2005 | Humphries |
| 2005/0174991 A1 | 8/2005 | Keagy |
| 2005/0190746 A1 | 9/2005 | Xiong |
| 2005/0190892 A1 | 9/2005 | Dawson |
| 2005/0192822 A1 | 9/2005 | Hartenstein |
| 2005/0201358 A1 | 9/2005 | Nelson |
| 2005/0201528 A1 | 9/2005 | Meer |
| 2005/0201529 A1 | 9/2005 | Nelson |
| 2005/0209995 A1 | 9/2005 | Aksu |
| 2005/0213716 A1 | 9/2005 | Zhu |
| 2005/0219067 A1 | 10/2005 | Chung |
| 2005/0232252 A1 | 10/2005 | Hoover |
| 2005/0238156 A1 | 10/2005 | Turner |
| 2005/0239458 A1 | 10/2005 | Hurtta |
| 2005/0242168 A1 | 11/2005 | Tesavis |
| 2005/0255857 A1 | 11/2005 | Kim |
| 2005/0259675 A1 | 11/2005 | Tuohino |
| 2005/0261002 A1 | 11/2005 | Cheng |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0010200 A1 | 1/2006 | Mousseau |
| 2006/0019724 A1 | 1/2006 | Bahl |
| 2006/0023747 A1 | 2/2006 | Koren et al. |
| 2006/0026288 A1 | 2/2006 | Acharya |
| 2006/0041375 A1 | 2/2006 | Witmer |
| 2006/0053225 A1 | 3/2006 | Poikselka |
| 2006/0058102 A1 | 3/2006 | Nguyen et al. |
| 2006/0068753 A1 | 3/2006 | Karpen |
| 2006/0069503 A1 | 3/2006 | Suomela |
| 2006/0072729 A1 | 4/2006 | Lee et al. |
| 2006/0074547 A1 | 4/2006 | Kaufman |
| 2006/0077911 A1 | 4/2006 | Shaffer |
| 2006/0088152 A1 | 4/2006 | Green |
| 2006/0104306 A1 | 5/2006 | Adamczyk |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0200359 A1 | 9/2006 | Khan |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0233338 A1 | 10/2006 | Venkata |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |
| 2006/0259365 A1 | 11/2006 | Agarwal et al. |
| 2006/0268120 A1 | 11/2006 | Funakura |
| 2006/0270421 A1 | 11/2006 | Phillips |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0004461 A1 | 1/2007 | Bathina |
| 2007/0014282 A1 | 1/2007 | Mitchell |
| 2007/0019614 A1 | 1/2007 | Hoffmann |
| 2007/0021908 A1 | 1/2007 | Jaugilas |

(56) References Cited

U.S. PATENT DOCUMENTS

| | | |
|---|---|---|
| 2007/0022011 A1 | 1/2007 | Altberg et al. |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0032244 A1 | 2/2007 | Counts |
| 2007/0036139 A1 | 2/2007 | Patel |
| 2007/0041516 A1 | 2/2007 | Dickinson |
| 2007/0049288 A1 | 3/2007 | Lamprecht |
| 2007/0054676 A1 | 3/2007 | Duan |
| 2007/0060097 A1 | 3/2007 | Edge |
| 2007/0072553 A1 | 3/2007 | Barbera |
| 2007/0081635 A1 | 4/2007 | Croak |
| 2007/0083911 A1 | 4/2007 | Madden |
| 2007/0115941 A1 | 5/2007 | Patel |
| 2007/0121601 A1 | 5/2007 | Kikinis |
| 2007/0139411 A1 | 6/2007 | Jawerth |
| 2007/0149166 A1 | 6/2007 | Turcotte |
| 2007/0149213 A1 | 6/2007 | Lamba |
| 2007/0162228 A1 | 7/2007 | Mitchell |
| 2007/0182631 A1 | 8/2007 | Berlinsky |
| 2007/0201623 A1 | 8/2007 | Hines |
| 2007/0206568 A1 | 9/2007 | Silver |
| 2007/0206613 A1 | 9/2007 | Silver |
| 2007/0208687 A1 | 9/2007 | O'Connor |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270164 A1 | 11/2007 | Maier |
| 2007/0291733 A1 | 12/2007 | Doran |
| 2008/0032703 A1 | 2/2008 | Krumm |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0077324 A1 | 3/2008 | Hatano |
| 2008/0080691 A1 | 4/2008 | Dolan |
| 2008/0117859 A1 | 5/2008 | Shahidi |
| 2008/0129475 A1 | 6/2008 | Breed |
| 2008/0162637 A1 | 7/2008 | Adamczyk |
| 2008/0176582 A1 | 7/2008 | Ghai |
| 2008/0186164 A1 | 8/2008 | Emigh |
| 2008/0195314 A1 | 8/2008 | Green |
| 2008/0200182 A1 | 8/2008 | Shim |
| 2008/0214202 A1 | 9/2008 | Toomey |
| 2008/0220747 A1 | 9/2008 | Ashkenazi |
| 2008/0288166 A1 | 11/2008 | Onishi |
| 2009/0003535 A1 | 1/2009 | Grabelsky |
| 2009/0067417 A1 | 3/2009 | Kalavade |
| 2009/0097450 A1 | 4/2009 | Wallis |
| 2009/0113346 A1 | 4/2009 | Wickramasuriya |
| 2009/0128404 A1 | 5/2009 | Martino |
| 2009/0177557 A1 | 7/2009 | Klein |
| 2009/0215466 A1 | 8/2009 | Ahl |
| 2009/0224931 A1 | 9/2009 | Dietz |
| 2009/0298488 A1 | 12/2009 | Snapp |
| 2009/0328163 A1 | 12/2009 | Preece |
| 2009/3281163 | 12/2009 | Preece |
| 2010/0003976 A1 | 1/2010 | Zhu |
| 2010/0004993 A1 | 1/2010 | Troy |
| 2010/0029244 A1 | 2/2010 | Moodbidri |
| 2010/0042592 A1 | 2/2010 | Stolz |
| 2010/0054220 A1 | 3/2010 | Bischinger |
| 2010/0067444 A1 | 3/2010 | Faccin |
| 2010/0069034 A1 | 3/2010 | Dickinson |
| 2010/0624788 | 3/2010 | Nagorniak |
| 2010/0167760 A1 | 7/2010 | Kim |
| 2010/0188992 A1 | 7/2010 | Raleigh |
| 2010/0198933 A1 | 8/2010 | Smith |
| 2010/0223222 A1 | 9/2010 | Zhou |
| 2010/0268848 A1 | 10/2010 | Maurya |
| 2011/0113060 A1 | 5/2011 | Martini |
| 2011/0165861 A1 | 7/2011 | Wilson et al. |
| 2011/0273568 A1 | 11/2011 | Lagassey |
| 2012/0001750 A1 | 1/2012 | Monroe |
| 2012/0189107 A1 | 7/2012 | Dickinson |

FOREIGN PATENT DOCUMENTS

| | | |
|---|---|---|
| WO | WO02/11407 | 7/2001 |
| WO | WO2004/025941 | 3/2004 |
| WO | WO2007/027166 | 6/2005 |
| WO | WO2005051033 | 6/2005 |

OTHER PUBLICATIONS

Le-Pond Chin, Jyh-Hong Wen, Ting-Way Liu, The Study of the Interconnection of GSM Mobile Communications Systems Over IP Based Network, May 6, 2001, IEEE, Vehicular Technology Conference, vol. 3, pp. 2219-2223.

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

$3^{rd}$ Generation Partnership Project 2, Position Determination Service Standard for Dual Mode Spread Spectrum Systems, Feb. 16, 2001, pp. i-X, 1-1-1-5, 2-1-2-2, 3-1-3-51, 4-1-4-66, A-1-A-2, B-1-B-2, C-1-C-2, D-1-D-2.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Extended European Search Report from EPO in European Appl. No. 06827172.5 dated Dec. 29, 2009.

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Nars Haran, U.S. Cellular, Packet Data—Roaming and LBS Overview, Nov. 2, 2007, pp. 1-15.

Location Based Services V2 Roaming Support (non proprietary), 80-V8470-2NP A, dated Jan. 27, 2005, pp. 1-56.

Yilin Ahao, Efficient and reliable date transmission for cellular and GPS based mayday systems, Nov. 1997, IEEE, IEEE Conference on Intelligent Transportation System, 1997. ITSC 97, 555-559.

Examiner's Office Letterin Japanese Patent Application No. 2006-542691 dated Sep. 7, 2009.

JP Laid-Open Gazette No. 2004-158947 (English abstract only).

JP Laid-Open Gazette No. 2007-507123 (counterpart English text US Patent Application Publication No. 2007/0054676).

T. Hattori, "Wireless Broadband Textbook," IDG Japan, Jun. 10, 2002, p. 142-p. 143. (no. English text).

Schulzrinne et al., Emergency Services for Internet Telephony Systems draft-schulzrinne-sipping-emergency-arch, IETF Standard Working Draft, Feb. 4, 2004, 1-22.

* cited by examiner

ESQK DATA STORE

ESQK POOL ID DATA STORE

FIG. 2A

| | ESQK POOL ID | ESQK | TIMESTAMP | CALL DATA ID |
|---|---|---|---|---|
| 301 | 1 | 11111111111 | Yesterday @ 10:11 PM | NULL |
| 302 | 1 | 22222222222 | Today @ 9:00 AM | NULL |
| 303 | 2 | 33333333333 | Two days ago @ 8:00 AM | 1234 |
| 304 | 2 | 44444444444 | Today @ 11:59 AM | 5678 |
| 305 | 3 | 55555555555 | Current Time + two hours | NULL |
| 306 | 3 | 66666666666 | Current time-one hour | NULL |

SAMPLE ESQK DATA STORE CONTENTS

FIG. 2B

| | ESQK POOL ID | GUARD TIMER | HOLD TIMER |
|---|---|---|---|
| 307 | 1 | 30 MINUTES | — |
| 308 | 2 | 30 MINUTES | — |
| 309 | 3 | 30 MINUTES | 2 HOURS |

SAMPLE ESQK POOL ID DATA STORE CONTENTS

EXTENDED EFFICIENT USAGE OF EMERGENCY SERVICES KEYS

This application is a continuation of U.S. patent application Ser. No. 11/987,048, entitled "Extended Efficient Usage of Emergency Services Keys," filed on Nov. 27, 2007; which is a Continuation-In-Part of U.S. application Ser. No. 11/797,445, filed May 3, 2007, which claims priority from U.S. Provisional Application No. 60/797,359, filed May 4, 2006, the entirety of all three of which are expressly incorporated herein by reference.

BACKGROUND OF THE INVENTION

1. Field of the Invention

This invention relates generally to long distance carriers, Internet Service Providers (ISPs), and information content delivery services/providers and long distance carriers. More particularly, it relates to emergency call systems (e.g., E9-1-1) including wireless and Internet Protocol (IP) based Voice Over Internet Protocol (VoIP) emergency call systems.

2. Background of Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, based on a special identifier (P-ANI, or "Pseudo Automatic Number Identifier", also referred to as "ESxK"), and includes the transmission of callback number and location information when 9-1-1 is used. E9-1-1 may be implemented for landline, cellular or VoIP networks. Regardless of the network type, a 9-1-1 service becomes E-9-1-1 when automatic number identification and automatic location information related to the call is provided to the 9-1-1 operator at the PSAP.

A Public Service Answering Point (PSAP) is a dispatch office that receives 9-1-1 calls from the public. A PSAP may be a local, fire or police department, an ambulance service or a regional office covering all services. As used herein, the term "PSAP" refers to either a public safety access point (PSAP), or to an Emergency Call Center (ECC), a VoIP term.

FIG. 4 shows a conventional landline public safety access point (PSAP) to automatic location identifier (ALI) connection.

In particular, FIG. 4 shows a PSAP 400 connected to one Automatic Location Identifier (ALI) database 401. An ALI is a database that accepts a PSAP query with telephone number, relates the telephone number to an address and provides that address (location information) back to the PSAP in a manner that works for the customer premise equipment (CPE) display. An ALI is typically owned by a LEC or a PSAP, and may be regional (i.e. connected to many PSAPs) or standalone (i.e. connected to only one PSAP). There is no one single standard interface protocol for PSAP-ALI connection/communication.

Upon receiving a 9-1-1 call, the PSAP 400 queries the ALI 401 for location data. The ALI database 401 accepts the query from the PSAP 400 for location. The query includes the telephone number of an emergency caller. The ALI database 401 relates the received telephone number to a physical street address and provides that street address (location information) back to the PSAP 400 in a manner that works for the customer premise equipment (CPE) display at the PSAP 400.

FIG. 5 shows a context diagram for a conventional non-landline positioning center (e.g., an Internet based voice over Internet Protocol (VoIP) positioning center).

In particular, the ALI database 401 includes a conventional emergency services key (ESQK or ESRK) in a location request sent to an appropriate positioning center 402 (XPC). The emergency services key (ESQK or ESRK) is used by the positioning center 402 as a key to look up the location and other call information associated with the emergency call.

In non-landline telephony, the PSAPs 400 query the ALI 401 for location information. However, the ALI 401 is not pre-provisioned with location data for non-landline calls (e.g. cellular, VoIP etc) and must communicate with other network entities to obtain and deliver location data to the PSAP 400.

Non-landline telephony standards (e.g. cellular, VoIP etc) have mandated that ALIs 401 maintain connectivity to a positioning center 402 that is able to provide current location data for a non-landline call. In the current state of technology, the positioning center 402 provides the caller's location and the callback number to the ALI, which passes it to the requesting PSAP. As can be seen in FIG. 5, an ALI may maintain connectivity to more than one positioning center via multiple interface types—both standard and non-standard (e.g. NENA-02, E2/E2+N-E2(ESP), PAM, etc.).

Whether landline or non-landline, conventional emergency call centers, e.g., public safety access points (PSAPs) 400, use emergency services keys such as an emergency services query key (ESQK) or an emergency services routing key (ESRK), collectively referred to herein as ESxK, to query for location information. An emergency services key identifies an emergency call, and is associated with a particular selective router 417 associated with a given public safety access point (PSAP) 400. The emergency services keys ESQK and ESRK are conventionally used to query the automatic location identification (ALI) database 401 for the location of a given emergency caller. An emergency services key is delivered to the E9-1-1 selective router 417 and is the calling number/ANI for the call to the PSAP 400. The emergency services key is used by a selective router 417 as a key to selective routing data associated with the emergency call. The emergency services key is delivered by the selective router 417 to a PSAP 400 as the calling number/ANI for the emergency call, and is subsequently used by the PSAP 400 to request automatic location information (ALI) information indicating the location of the device making the emergency call. Conventional emergency services keys conform to ten-digit North American Numbering Plan Number definitions.

Existing, standardized solutions prescribe a finite pool of emergency services keys (ESQK and ESRK) which are allocated individually, one associated for each emergency call in progress. ESxK numbers are used to request updated location information from the ALI 401 while an emergency call is active, and as such, as appreciated by the inventors hereof, are subject to number exhaustion if the number of active emergency calls exceeds the number of ESxKs in the pool. But because ESxKs (ESQKs and ESRKs) are dynamically assigned at the time of call origination, and because the pool of ESxKs is limited, the inventors appreciate that it is possible for the pool of available ESxKs to run out.

For systems which implement ESQK and/or ESRK keys, it is a well known technique to use timers and default ESxKs to avoid problems associated with a limited pool of ESxKs. Timers have been specified and implemented to limit the amount of time that an ESxK can remain allocated to an emergency call, without regard for the actual call duration. For example, if a call continues after the timer has expired; the specific ESxK which was used to obtain updated location information can get reassigned to a new incoming emergency call.

However, timers are based solely on estimated call duration, a value which could be exceeded. Since emergency calls are numerous, and can remain active for long periods of time once initiated, some service providers have increased the number of allocated ESxK pools in an effort to minimize number pool exhaustion. Additionally, reliance on timers requires much larger pools of ESxKs to be allocated, which is an inefficient use of numbers, and may potentially lead to number exhaustion.

The conventional technique of using timers to expire the ESQK and ESRK allocation could prove to be devastating if a given emergency call using that expiring ESxK is still active. This is especially true if there is updated location information which would help provide emergency assistance to the caller.

Moreover, ESxK numbers must be purchased, so large numbers of ESxKs represent a direct cost to a provider. Also, as requirements for capacity increase, existing systems must often increase the size of the ESQK and ESRK number pool that they purchase, leading to additional costs for ESQK and ESRK number purchases, additional costs to implement, and additional costs to maintain these larger number pool sizes.

Thus, emergency services keys, e.g., the emergency services query key (ESQK) or the emergency services routing key (ESRK), identify a call instance at a VoIP positioning center (VPC). The ESQK is selected from a pre-provisioned pool by the VPC and delivered to the PSAP (Public Safety Answering Point) as the calling number for an emergency call. The ESQK is subsequently used by the PSAP to request ALI (Automatic Location Identification) information for the call from the VPC. The ESQK is used by the VPC as a key to look up the location object and other call information associated with the emergency call instance. This information is returned to the PSAP.

But, the size of an ESQK pool is limited for VoIP emergency calls. During normal operation emergency calls are associated with an ESQK as long as the emergency call is in process. As soon as the call is terminated, the ESQK is "released" and marked as free. Once all pre-provisioned ESQKs have been associated with emergency calls they are marked as "unavailable/in-use." New incoming emergency calls coming in at that time must still be served and assigned an ESQK from the given pre-provisioned pool.

Currently systems conform to NENA VoIP Architecture For Enhanced 9-1-1 Services, NENA standard 08-001. However, such systems are complicated in nature, and thus not practical.

There is a need for a more efficient use of available emergency services keys.

SUMMARY OF THE INVENTION

In accordance with the principles of the present invention, a method and apparatus for recyclably using an emergency services key selected from among a limited size pool comprises selecting an emergency services key from a limited size pool having an older timestamp associated therewith from among those in the pool, in the event that no emergency services key in the pool meets the first attempt selecting criteria. A timestamp associated with the selected emergency services key is reset to a current time plus a value of a guard timer. In this way, selection of the emergency services key is assured to be available when selected.

BRIEF DESCRIPTION OF THE DRAWINGS

Features and advantages of the present invention will become apparent to those skilled in the art from the following description with reference to the drawings:

FIG. 2a shows exemplary contents of the ESQK data store shown in FIG. 1a, in more detail, in accordance with the principles of the present invention.

FIG. 2b shows exemplary contents of the ESQK Pool ID data store shown in FIG. 1b, in more detail, in accordance with the principles of the present invention.

DETAILED DESCRIPTION OF ILLUSTRATIVE EMBODIMENTS

The present invention provides for the management of a limited size emergency services key pool (e.g., an ESQK pool) in such a way as to ensure that an ESQK can always be handed out to an incoming emergency call, even if all ESQK pool members are marked as unavailable and to hold onto it even after the call is released. The invention applies equally to efficient use of emergency services routing keys (ESRKs) used in the wireless industry where the gateway mobile location centre (GMLC) takes the functional role of the voice over Internet Protocol (VoIP) positioning center (VPC). Ultimately the invention applies to any limited size pool of unique numbers that need to be dynamically allocated to a resource for a limited time in such a way to always guarantee the availability of a pool element.

Figure 1A:
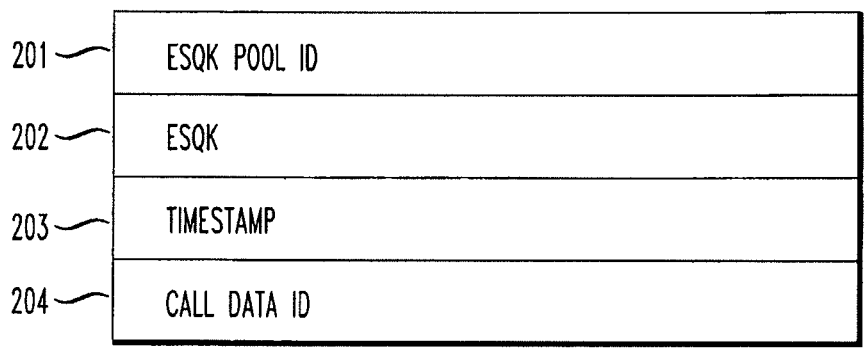
FIG. 1a shows an exemplary ESQK data store, in accordance with the principles of the present invention.

Selecting an ESQK from a Pool:

FIG. 1a shows an exemplary ESQK data store 200, in accordance with the principles of the present invention.

In particular, as shown in FIG. 1a, a plurality of ESQKs are grouped into a pool of emergency service keys, identified herein with an "ESQK Pool ID" 201.

The ESQK pool ID includes ESQK(s) 202. The ESQKs 202 element of the ESQK data store 200 is capable of containing anywhere from 1 to N number of ESQKs 202, N being any number greater than 1.

The size of N is limited by network factors, such as the size of a database, but mostly based on the number of ESQKs assigned for use by the given network element.

Each ESQK 202 preferably has a "Timestamp" 203 associated therewith. The timestamp 203 preferably relates to a representation of the current time of day of assignment of the associated ESQK 202 to a specific emergency (e.g., E911) call.

Each ESQK 202 also includes information relating to the specific emergency E911 call, referred to herein as "Call Data ID" 204. The Call Data ID 204 information identifies the specific emergency E911 call.

Figure 1B:
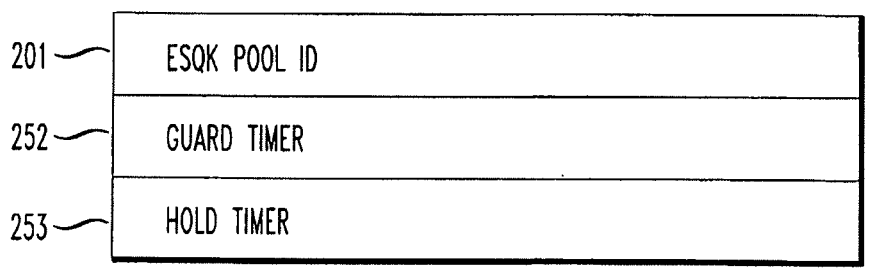
FIG. 1b shows an exemplary ESQK Pool ID data store, in accordance with the principles of the present invention.

FIG. 1b shows an exemplary ESQK Pool ID data store 250, in accordance with the principles of the present invention.

The ESQK Pool ID data store 250 is a table associating an ESQK pool ID 201 with a possible Guard Timer 252 and Hold Timer 253.

FIG. 2a shows exemplary contents of the ESQK data store 200 shown in FIG. 1a, in more detail, in accordance with the principles of the present invention.

In particular, as shown in FIG. 2a, an exemplary ESQK Data Store 200 includes three (3) ESQK pools: ESQK pool #1 (as depicted in rows 301 and 302, ESQK pool #2 (as depicted in rows 303 and 304) and ESQK pool #3 (as depicted in rows 305 and 306). In this exemplary embodiment, each of the exemplary ESQK pools #1 (301, 302) and #2 (303, 304) contain two ESQKs 202, and the exemplary ESQK pool #3 (305, 306) contains one ESQK 202.

FIG. 2b shows exemplary contents of the ESQK Pool ID data store 250 shown in FIG. 1b, in more detail, in accordance with the principles of the present invention.

In particular, as shown in FIG. 2b, ESQK pools #1 307 and #2 308 each have a Guard Timer 252 associated therewith, but no Hold Timer 253, whereas pool #3 309 contains both a Guard Timer 252 and a Hold Timer 253—in this example a Hold Timer 253 of 2 hours.

Figure 3:
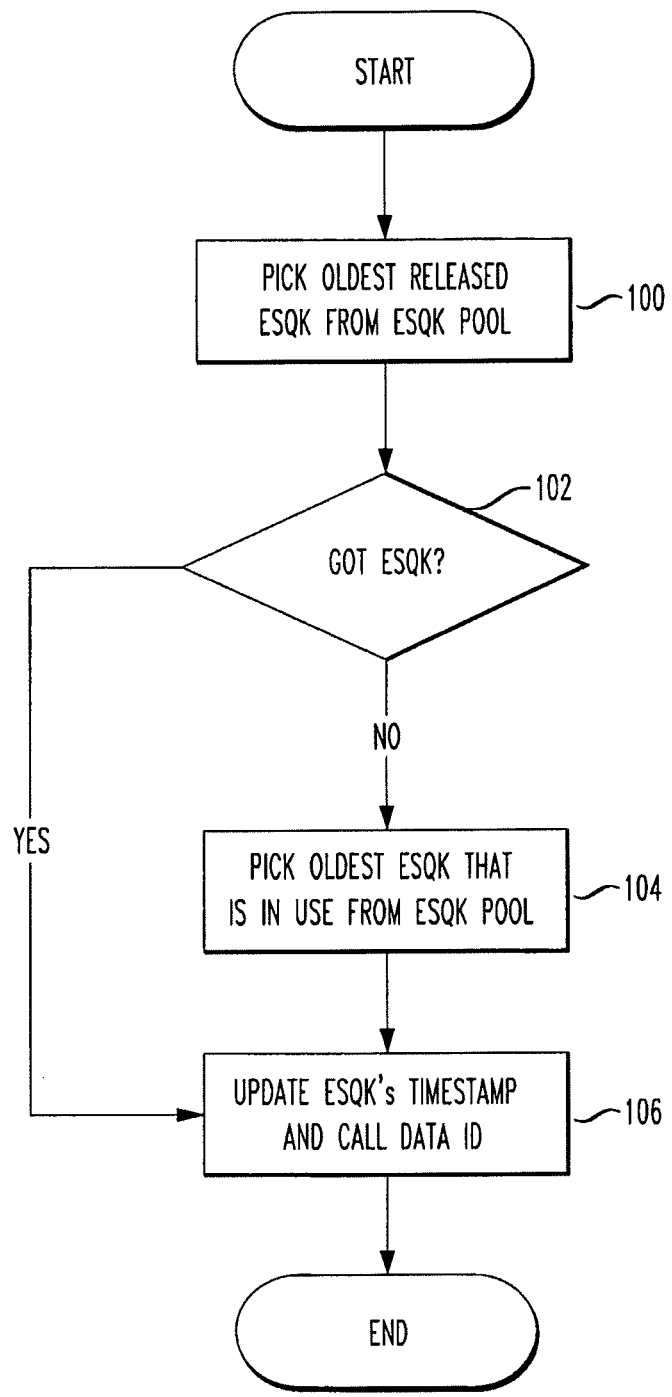
FIG. 3 illustrates exemplary selection of an emergency services key (e.g., an emergency services query key (ESQK)) from a pool of ESQK keys, in accordance with the principles of the present invention.
Figure 4:
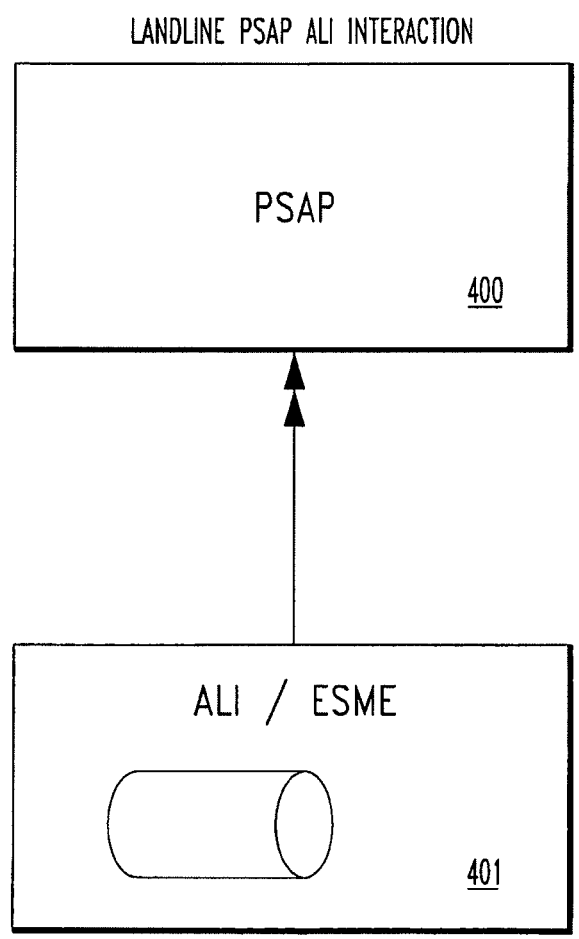
FIG. 4 shows a conventional landline public safety access point (PSAP) to automatic location identifier (ALI) connection.
Figure 5:
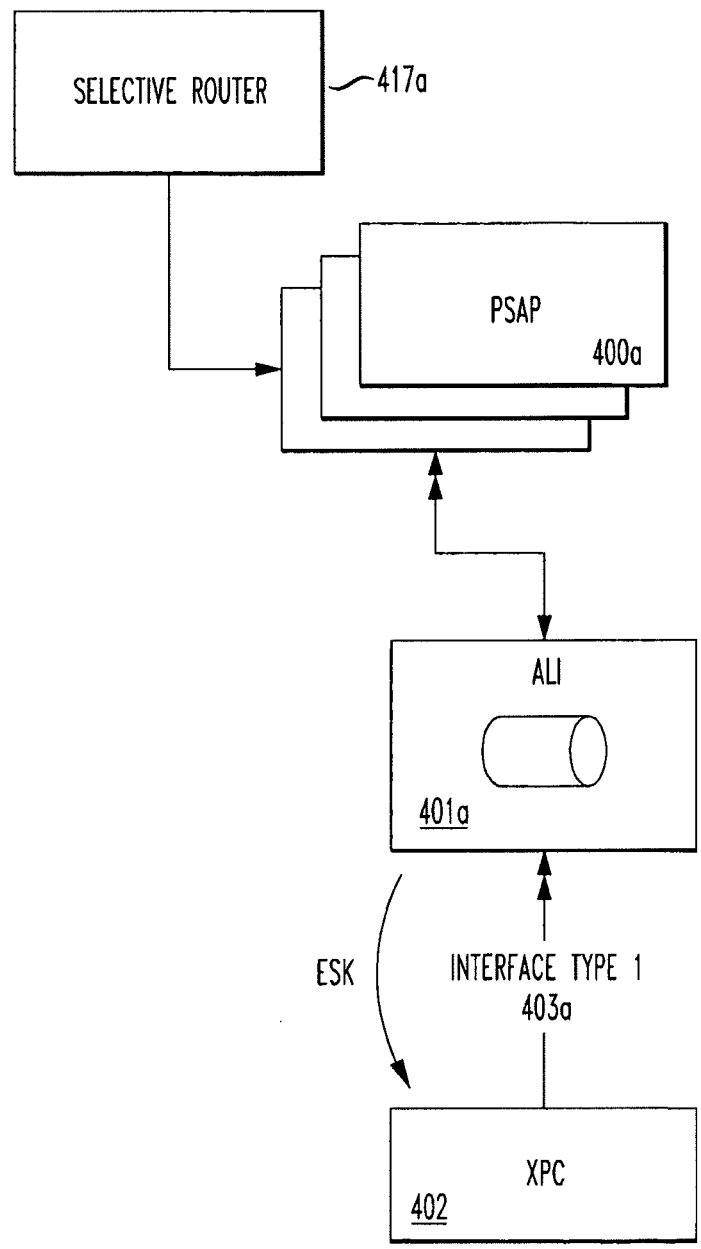
FIG. 5 shows a context diagram for a conventional non-landline positioning center (e.g., an Internet based voice over Internet Protocol (VoIP) positioning center).

FIG. 3 illustrates an exemplary selection of an emergency services key (e.g., an emergency services query key (ESQK)) from a pool of ESQK keys, in accordance with the principles of the present invention.

In particular, as shown in FIG. 3, an ESQK 202 is picked as follows for a given ESQK pool.

In step 100 of FIG. 3, the ESQK 202 in the ESQK pool having a Call Data ID 204 equal to "NULL" (NULL is used as a synonym for "not set" in this context), and having the oldest Timestamp 203, is chosen for selection.

In decision step 102, if no such ESQK having both Call Data ID=NULL and the older Timestamp is found in the given ESQK pool 200, then the method moves to step 104 where the ESQK with merely an older or oldest Timestamp is selected.

The inherent logic is that in the latter scenario ESQKs that are no longer associated with active emergency calls might be incorrectly marked to still be in use. The present inventors realized that this logic is no longer true under extreme conditions, such as an ESQK pool sized too small, or extremely high call volume, typically generated in a lab stress test environment. For most practical purposes the likelihood of this happening is extremely low. In this way, the inventive method always guarantees successful selection of an ESQK as long as the number of ESQKs in a given pool is >=1.

In step 106, the Timestamp 203 and Call Data ID 204 are preferably updated. The ESQK's timestamp 203 is set to the current time plus the value of the Guard Timer 252.

Returning an ESQK to a Pool:

When an emergency call is terminated the ESQK 202 that has been associated with the call up to that point is released. To achieve this, the ESQK record is retrieved from the ESQK data store 200, and the Call Data ID 204 parameter for that particular ESQK record is set to NULL.

In the call termination process the ESQK Pool ID Data Store 250 is checked. If no Hold Timer 253 is defined, then the Timestamp 203 parameter for that ESQK record is left unchanged. In this way, the ESQK record that was used retains the Timestamp 203 of the last time it was selected plus the value of the GuardTimer 252. At the time of the call termination this TimeStamp 203 may be in the future, in which case the ESQK 202 associated with this record will be further protected for the specified duration. However, if a Hold Timer 253 is defined, the Timestamp 203 parameter for that ESQK record is updated to the current time plus the value of the Hold Timer 253.

In this way an emergency services key such as an ESQK can be protected for a well specified duration after a termination event. This is a key to the present invention and crucial from the viewpoint of the PSAP, which may want to query the data associated with a particular emergency call well after it has been released.

As an example use of the inventive method, a request for an ESQK from ESQK pool #1 shown earlier in FIG. 2 would follow the method described and shown with respect to FIG. 3. In the given example, ESQK "11111111111" (row 301) would be chosen since it has a Call Data ID=NULL, and the oldest Timestamp.

A request for an ESQK from ESQK pool #2 would also follow the method described and shown with respect to FIG. 3. All ESQKs in ESQK pool #2 as depicted still have a value assigned as a Call Data ID. For instance, the ESQK in row 303 has a Call Data ID=1234, and the ESQK in row 304 has a Call Data ID=5678. Because the values for these Call Data ID is NOT NULL, they are both considered to be marked as "in-use" as referred to herein.

In this particular example, ESQK "33333333333" (row 303) would be chosen since no ESQK in the ESQK pool (i.e., ESQK pool #2) has a Call Data ID=NULL, and that ESQK (i.e., ESQK "3333333333" (row 303) is the ESQK in that ESQK pool having the oldest Timestamp. In this example, the oldest Timestamp is "Two days ago @ 8:00 AM".

The ESQKs in pool #3 309 have a well defined Hold Timer 253, unlike the ESQKs in pool #1 307 and #2 308 which have no Hold Timer 253 defined. A request for an ESQK from ESQK pool #3 309 would also follow the method described and shown with respect to FIG. 3. All ESQKs in ESQK pool #3 309 as depicted have no value assigned as a Call Data ID 204, however, the row in 305 is still protected by the Hold Timer 253 (seen in pool #3 309) and considered to be in-use. The ESQK in row 306 will be chosen. The latter ESQK was also protected by the Guard Timer 252/Hold timer 253 from pool #3 309, however the Timestamp 203 indicates that the timer already expired.

While the Timestamp 203 is represented as "Two days ago @ 8:00 AM", it is entirely within the principles of the present invention that other representations for a Timestamp 203 are possible. For instance, the Timestamp 203 may be represented in YYYY/MM/DD/HH/MM/SS format, or equivalent, as an example.

Accordingly, the invention guarantees that for a limited size ESQK pool, an ESQK can always be selected and associated with an ongoing emergency call with no measurable impact to existing calls.

While the disclosed examples relate to the selection of an emergency services query key (ESQK), the present invention is equally applicable to the selection of an emergency services routing key (ESRK).

While the invention has been described with reference to the exemplary embodiments thereof, those skilled in the art will be able to make various modifications to the described embodiments of the invention without departing from the true spirit and scope of the invention.

What is claimed is:

1. A method for selecting an emergency services key selected from a pool, comprising:
    selecting an older emergency services key, from a pool of emergency services keys, having a timestamp older than other emergency services keys from said pool of emergency services keys; and
    resetting a timestamp associated with said selected emergency services key.

2. The method for selecting an emergency services key selected from a pool according to claim 1, further comprising:

assuring an availability of said selected older emergency services key.

3. The method for selecting an emergency services key selected from a pool according to claim 1, wherein:
said timestamp is reset to a current time plus a value of a guard timer.

4. The method for selecting an emergency services key selected from a pool according to claim 1, wherein:
said selection occurs when no emergency services key in said pool of emergency services keys meets an attempted selection criteria.

5. The method for selecting an emergency services key selected from a pool according to claim 4, wherein:
said attempted selection criteria is a first attempted selection criteria.

6. The method for selecting an emergency services key selected from a pool according to claim 1, wherein:
said pool of emergency services keys is a limited size pool.

7. The method for selecting an emergency services key selected from a pool according to claim 1, wherein:
said older timestamp associated with said selected older emergency services key has an oldest timestamp from among those that are available in said pool.

8. The method for selecting an emergency services key selected from a pool according to claim 1, wherein:
said emergency services keys are emergency services query keys (ESQKs).

9. The method for selecting an emergency services key selected from a pool according to claim 1, wherein:
said emergency services keys are emergency services routing keys (ESRKs).

10. A method of using an emergency services key selected from among a pool, comprising:
selecting an older emergency services key, from a pool of emergency services keys, having a timestamp older than other emergency services keys in said pool; and
resetting a timestamp associated with said selected older emergency services key to a current time plus a value of a hold timer, said hold timer being of greater value than any guard timer associated with said selected older emergency services key.

11. The method of using an emergency services key selected from among a pool according to claim 10, further comprising:
assuring an availability of said selected older emergency services key.

12. The method of using an emergency services key selected from among a pool according to claim 10, wherein:
said timestamp is reset to a current time plus a value of a guard timer.

13. The method of using an emergency services key selected from among a pool according to claim 10, wherein:
said selection occurs when no emergency services key in said pool meets an attempted selection criteria.

14. The method of using an emergency services key selected from among a pool according to claim 13, wherein:
said attempted selection criteria is a first attempted selection criteria.

15. The method of using an emergency services key selected from among a pool according to claim 10, wherein:
said pool of emergency services keys is a limited size pool.

16. The method of using an emergency services key selected from among a pool according to claim 10, wherein:
said older timestamp associated with said selected older emergency services key has an oldest timestamp from among those that are available in said pool.

17. The method of using an emergency services key selected from among a pool according to claim 10, wherein:
said emergency services keys are emergency services query keys (ESQKs).

18. The method of using an emergency services key selected from among a pool according to claim 10, wherein:
said emergency services keys are emergency services routing keys (ESRKs).

* * * * *